United States Patent [19]

Dangieri et al.

[11] 4,406,675

[45] Sep. 27, 1983

[54] RPSA PROCESS

[75] Inventors: Thomas J. Dangieri, Carmel, N.Y.; Robert T. Cassidy, Waldwick, N.J.

[73] Assignee: Union Carbide Corporation, Danbury, Conn.

[21] Appl. No.: 329,502

[22] Filed: Dec. 10, 1981

[51] Int. Cl.³ .............................................. B01D 53/04
[52] U.S. Cl. .......................................... 55/26; 55/58; 55/62; 55/75; 55/162; 55/179; 55/389
[58] Field of Search ................... 55/25, 26, 58, 62, 68, 55/75, 162, 179, 389

[56] References Cited

U.S. PATENT DOCUMENTS

| | | | |
|---|---|---|---|
| 3,719,025 | 3/1973 | Heinze et al. | 55/58 X |
| 4,129,424 | 12/1978 | Armond | 55/25 |
| 4,194,891 | 3/1980 | Earls et al. | 55/26 |
| 4,194,892 | 3/1980 | Jones et al. | 55/58 |
| 4,272,265 | 6/1981 | Snyder | 55/389 |
| 4,348,213 | 9/1982 | Armond | 55/25 |

FOREIGN PATENT DOCUMENTS 2042365 9/1980 United Kingdom ................... 55/26

*Primary Examiner*—Robert H. Spitzer
*Attorney, Agent, or Firm*—Alvin H. Fritschler

[57] ABSTRACT

A rapid pressure swing adsorption process utilizes two or more adsorbent beds, each of which undergoes on a cyclic basis, high pressure feed-adsorption, countercurrent exhaust and repressurization. The feeding of the feed gas mixture, such as air, to the adsorption system is temporarily discontinued upon completion of the feed step to each bed, with the discontinuity of feed before commencing the passing of said feed gas mixture to the next succeeding bed being essentially the same throughout the processing cycle, with the feed step at adsorption pressure for each bed being essentially the same and with said feed step being shorter in duration than said exhaust step.

47 Claims, No Drawings

RPSA PROCESS

BACKGROUND OF THE INVENTION

1. Field of the Invention

The invention relates to a pressure swing adsorption process for the separation of gases. More particularly, it relates to a improved rapid pressure swing adsorption process.

2. Description of the Prior Art

The rapid pressure swing adsorption process has been developed in order to extend the advantages of the well-known pressure swing adsorption technology to applications such as the production of breathing oxygen from air. Such oxygen is used for high altitude breathing in aircraft and by persons suffering from respiratory ailments. The rapid pressure swing adsorption, i.e., RPSA, process overcomes the disadvantages inherent in conventional pressure swing adsorption techniques when applied to such applications, e.g., the low adsorbent productivity for supplying breathing oxygen to an individual user.

The RPSA process, which has been described with respect to various particular embodiments in the Earls ar al. patent, U.S. Pat. No. 4,194,891, and in the Jones et al. patent, U.S. Pat. No. 4,194,892, broadly involves the cyclic process of feed and adsorption at higher pressure, exhaust and repressurization carried out on a very rapid basis, i.e., in less than about 30 seconds, in a manner not feasible in the conventional PSA processing cycles used to produce oxygen or other product gases on a commercial scale. Desirable features of the RPSA process are the compactness and light weight of the systems used to carry out the process, these features pertaining without sacrifice in the high oxygen or other product gas enrichment obtainable or in the advantageously high productivity of the RPSA process and system.

On the basis of the general knowledge of the art with respect to pressure swing adsorption technology, operation of the RPSA process at higher feed gas pressure—adsorption levels would be expected to increase the incremental loading of the more readily adsorbable component, e.g., nitrogen in air separation applications, thereby improving the productivity of the RPSA process. In this regard, productivity has been defined as the pounds of pure oxygen, or other desired less readily adsorbable component, produced in the product gas per pound of adsorbent used per unit of time. The RPSA process has heretofore been successfully applied for air separation at relatively low pressure feed gas pressures, that is at pressures of less than about 25 psig, e.g., at pressures generally on the order of about 20 psig. Attempts to operate the RPSA process, of proven design at such lower pressures, at higher feed gas pressure—adsorption levels have not proven entirely satisfactory.

Problems encountered upon efforts to extend the RPSA process to higher feed gas pressure levels, e.g., from 20 psig to about 40 psig, have included considerable difficulty in controlling the stability of product purity as the demand rate is increased in high product enrichment applications, as when 90–95% oxygen is required. In circumstances where product enrichment is critical, as where, for example, 94.5% oxygen may be specified, it has been found necessary to significantly reduce the productivity of the RPSA system in order to meet the product purity requirements.

In addition, the efficiency of the product separation from the feed gas mixture has decreased as the feed gas pressure has been increased to the higher levels indicated above. Such a decrease in oxygen recovery will result in an increase in the amount of the feed gas mixture that must be processed by the RPSA system if the overall product demand rate and product purity are to be maintained. This results in an increase in pumping power costs and in the size of the feed compressors employed in the RPSA process.

Such problems of product purity and recovery are aggravated by the strict limitations imposed on the total cycle time for each bed in RPSA processing operations. As the feed gas mixture is continuously passed to the system for feeding to each bed in turn, in the course of continuous, cyclic RPSA processing operations, the total cycle time for each adsorbent bed to complete its cycle of adsorption, exhaust, repressurization, and any delay periods desirably included therein, is necessarily very short, particularly in applications in which a limited number of adsorbent beds are emloyed for high productivity, high purity applications. As at least one adsorbent bed will always be accepting the pressurized feed gas mixture to be separated in continuous processing operations as heretofore developed, the time available for the exhausting of the more readily adsorbable gas component from the bed becomes extremely restricted.

Confronted with such problems, it is not feasible to simply lengthen the adsorption beds in various high pressure RPSA applications for which the size and weight of the system is critical to its success. In onboard oxygen enrichment systems for military aircraft, as an example, it is not feasible to employ longer, i.e., heavier, adsorbent beds to overcome the disadvantages associated with higher pressure operations. The alternative of decreasing the amount of feed gas entering each bed during the feed portion of the cycle, by decreasing the feed time for each bed, is also disadvantageous as a decrease in feed time in a continuous process cycle is achieved only by a decrease in the total cycle time for each bed. This creates additional processing and mechanical problems. Thus, the desorption and purge time of the exhaust step must also be shortened, which adversely affects the loading capacity of the adsorbent. In addition, the rapid speed of each cycle under such conditions tends to impose problems in the valves for the process that cannot be tolerated in practical, commercial RPSA operations. There exists, therefore, a genuine need in the art for improvements in the RPSA technology to enable higher productivity to be achieved for a given product purity without increasing the size of the adsorption system.

It is an object of the invention, therefore, to provide an improved RPSA process.

It is another object of the invention to provide an RPSA process capable of enhancing productivity for a given product gas purity without an increase in the size of the adsorption system.

It is a further object of the invention to provide an RPSA process having improved performance at high pressures above about 25 psig.

With these and other objects in mind, the invention is hereinafter described in detail, the novel features thereof being particularly pointed out in the appended claims.

SUMMARY OF THE INVENTION

The invention employs a discontinuous feed step in which the feed time at adsorption pressure can be reduced essentially without reduction in the exhaust time available in each processing cycle. Productivity of the RPSA system can thereby be improved at a given product purity level, without the necessity for increasing the size of the RPSA system to achieve such improved productivity.

DETAILED DESCRIPTION OF THE INVENTION

The objects of the invention are accomplished by employing a discontinuous feed gas cycle to an RPSA system, thereby overcoming the problems of size and weight otherwise encountered in efforts to extend RPSA processing operations to high pressure applications. In this purpose, the passing of the feed gas mixture to be treated is temporarily discontinued upon completion of the feed step at high adsorption pressure to each bed of the system. As will be seen from the description of the invention herein, this feed discontinuity overcomes the disadvantages heretofore associated with known operations in which the feed gas mixture is passed continuously to an RPSA system having two or more adsorbent beds therein.

The RPSA process can advantageously be employed for the selective adsorption of at least one more readily adsorbable gas component from a feed gas mixture of said component with at least one less readily adsorbable component. In the process, each adsorbent bed in the RPSA system undergoes, on a cyclic basis, a processing sequence that includes (1) feeding the gas mixture to the feed end of the bed for selective adsorption of the more readily adsorbable gas component of the mixture at high adsorption pressure, with withdrawal of the less readily adsorbable gas component as product effluent from the opposite or discharge end of the bed, (2) countercurrently depressurizing the bed, with the more readily adsorbable gas component thereby being exhausted from the feed end of the bed, and (3) repressurizing the bed from the lower pressure reached during countercurrent depressurization to a higher intermediate pressure or to the high final adsorption pressure for the adsorption of the more readily adsorbable component from additional quantities of the feed gas mixture during the next processing cycle in the bed. As will be further described below, the RPSA cyclic processing sequence that includes such high pressure feed-absorption, exhaust and repressurization steps may also include a delay period to further enhance the overall process. FIG. 2 of the above-indicated Earls et al. patent, U.S. Pat. No. 4,194,891, illustrates a two bed RPSA processing sequence in which each bed follows to feed, delay, exhaust and repressurization sequence, with the feed gas mixture passing to the RPSA process on a continuous basis, with the feed to the second bed commencing with the termination of the feed to the first bed.

In a typical conventional RPSA system employing this sequence, the feed, delay, exhaust and repressurization steps consume 0.8, 0.3, 0.8 and 0.5 seconds, respectively, with the total cycle time being 2.4 seconds. Such a process can be successfully employed at the relatively low adsorption pressures referred to above, e.g., up to on the order of about 20 psig. At the higher pressure levels desired for particular applications, such as on-board RPSA oxygen-enrichment systems for military aircraft, such a process is subject to the disadvantages and problems discussed above. An effort to decrease the amount of the feed gas mixture passed to each bed during each processing cycle is confronted with the resultant decrease in exhaust time and associated mechanical problems under the very limited time sequence of such applications, as also discussed above.

The invention overcomes such difficulties and enables higher pressure operations to be carried out successfully without sacrifice in desired product purity or undesired increase in the size of the RPSA system. In accordance with the practice of the invention, the feeding of the feed gas mixture to the adsorption system is temporarily discontinued upon completion of the feed step to each bed of the system. The time of discontinuity of feed before commencing the passing of the gas mixture to the next succeeding bed is maintained approximately the same throughout the processing cycle. In addition, the time of the feed step to each bed at high pressure adsorption conditions is essentially the same throughout the processing cycle. The time of feed discontinuity will vary, of course, depending upon the particular conditions applicable to any give RPSA application. Thus, the discontinuity may extend into a portion of the delay period of the bed that has just completed its high pressure adsorption step, if such a delay is employed, to the end of such delay period, or into the exhaust step of such bed or beyond depending upon the particular circumstances of a given application. As a result of the discontinuity of feed as provided in the practice of the invention, the feed step at adsorption pressure for each bed can be made shorter in duration than the exhaust step, with the amount of feed gas being passed to each bed per cycle being decreased without sacrifice in the time needed to purge and repressurize each bed prior to the next high pressure feed-adsorption step as the next processing cycle is commenced in said bed.

In one embodiment of the invention having a total cycle time of about 2.4 seconds, the feed, delay, exhaust and repressurization steps consume about 0.4, 0.3, 0.9 and 0.8 seconds, respectively. By comparison with the typical conventional operation having the same total time as indicated above, it will be seen that the amount of time devoted to high pressure feed-absorption is significantly reduced, i.e., from 0.8 to 0.4 seconds. In addition, the delay period for each cycle is the same, i.e., 0.3 seconds, while the time available for repressurization is greater in the cycle of the invention than in the conventional cycle, i.e., 0.8 as compared to 0.5 seconds. Quite significantly, the time available for the exhaust step, in which the bed is rejuvenated for further use, is approximately the same in each case, being 0.9 seconds in the invention cycle and 0.8 seconds in the conventional cycle. In the conventional system, any reduction in the feed time would necessarily cause a corresponding reduction in other step times within the cycle, leading to the disadvantages and problems referred to above.

Variations can, of course, be made in the time provided for each step within the total cycle time of any particular application. In the 2.4 second total cycle time embodiment above, for example, processing sequences such as 0.4, 0.3, 0.8 and 0.9 seconds or 0.5, 0.3, 0.8 and 0.8 seconds can readily be used. In all such embodiments of the invention, the feed step will be shorter in duration than the exhaust step, often significantly shorter as in the illustrative examples above. For processing convenience, the time of feed to each bed in the adsorption system will generally be maintained essentially the same throughout the processing cycle. In addition, the time of discontinuity of feed will be maintained essentially the same throughout the processing cycle, mainly to avoid complex and troublesome apparatus problems associated with variations in the processing cycle from bed-to-bed in any given RPSA system. In the 0.4, 0.3, 0.9 and 0.8 second embodiment of the invention referred to above, the feed to the first bed of a 2 bed adsorption system continues for the indicated 0.4 seconds, which the second bed is on the non-feed portion of its cycle. At the end of said 0.4 seconds, the feed to the adsorption system is temporarily discontinued for a period of about 0.5 seconds after which the feeding of the feed gas mixture to the second bed commences during the exhaust step of the first bed. Those skilled in the art will appreciate that at the very short total cycle times involved, particularly in the illustrative examples above, the individual step and overall cycle times are necessarily by approximate, a circumstance reflected by use of the term "about" herein with respect to such processing cycle times.

In addition to the higher pressure feed-absorption, exhaust and repressurization steps, it has been indicated that the process of the invention can employ a delay period as part of the overall processing sequence. Thus, the processing cycle may comprise, in sequence in each bed, the steps of feed, delay, exhaust and repressurization as in the illustrative examples above. It will be appreciated that the terms "feed" step or "high pressure feed-adsorption", or the like are used to denote that period of time during which a pressurized feed gas mixture is introduced to the feed end of an adsorbent bed at the high adsorption pressure of a given application. The terms "exhaust" or "exhausting" denote that period of time, or portion of the overall cycle, when gas at a lower pressure than the high feed-adsorption pressure is caused to leave the bed at the feed end thereof, i.e., the countercurrent depressurization time. While such countercurrent depressurization will inherently be to a lower pressure than the adsorption pressure, those skilled in the art will appreciate that it is desirable to depressurize the bed to as low a pressure as possible so that the more readily adsorbable gas component will be desorbed and swept from the bed to the fullest practical extent during the countercurrent depressurization step. Accordingly, the countercurrent depressurization step will commonly be continued until atmospheric or subatmospheric pressures are reached at the feed end of the bed, the latter necessarily involving a vacuum cycle. The delay period in the indicated processing sequence is a period of time during which no feed gas mixture is being fed to the bed and no gas is being exhausted from the bed by countercurrent depressurization during the delay period. During this period, the gas pressure in the bed will decrease from adsorption pressure as gas in the bed travels through the bed to the discharge end and from this end of the bed during the delay period.

In addition, the invention can be practiced in a feed, exhaust and delay sequence in which said delay period constitutes the repressurization step of the overall cycle. In this embodiment, the delay period again occurs with no feed to the bed and with no gas being exhausted from the bed by countercurrent depressurization during the delay period. The pressure within the bed increases during this delay period as product quality gas passes from the downstream product manifold into the discharge end of the lower pressure bed during this delay period following the exhaust step. The delay step thus constitutes a partial countercurrent repressurization of the bed to a higher intermediate pressure. Upon commencing of the feeding of the feed gas mixture to the bed at high adsorption pressure, the bed will be found to very rapidly increase to said high adsorption pressure from said intermediate pressure so that a separate repressurization step, in addition to said delay period, becomes unnecessary. In another embodiment of the invention, the processing sequence may comprise a feed, delay, exhaust and further delay cycle. In this case, each delay period functions as described above with respect to embodiments employing only a single delay period, after either the feed step or after the exhaust step.

The invention may be practiced in RPSA systems having at least two adsorbent beds, with from two to ten adsorbent beds, more commonly with from two to five adsorbent beds generally being employed. In many practical commercial applications, it will be understood that two bed, three bed or four bed systems will be particularly advantageous. Those skilled in the art will also appreciate that, when four or five or more beds are employed in an adsorption system, it is generally desirable to arrange the system so that the feed gas mixture can be passed to at least two adsorbent beds at any particular time, typically in overlapping sequence. In such systems, of course, each bed undergoes the particular processing sequence being employed, on a cyclic basis, as continuous operations continue in the system. In accordance with the invention, the feeding of the feed gas mixture to the adsorption system remains discontinuous, with the period of discontinuity being approximately the same through the cycle.

The practice of the invention is particularly advantageous at adsorption pressures above about 20 psig, although the invention can also be employed at the lower pressure levels to which the RPSA process has successfully been applied. The invention is preferably applied at adsorption pressures of from about 25 to about 60 psig, although pressures above this range may also be employed. Adsorption pressures of from about 30 to about 40 psig have been found particularly convenient for certain practiced applications.

While the invention can be practiced with respect to its various embodiments within the time limitations heretofore applicable to RPSA systems, e.g. up to about 30 seconds, the total operating or cycle time for each processing cycle is preferably on the order of from about 2 to about 10 seconds for oxygen recovery by air separation. Similarly, the feed step at adsorption pressure can vary widely within such overall limits, provided that said high pressure feed-adsorption step is shorter than the exhaust step for the purposes discussed above. The feed step at high pressure conveniently consumes from about 0.2 to about 0.6 seconds, with about 0.4 or 0.5 seconds having been found particularly convenient for certain practical commercial applications relating to on-board oxygen enrichment systems for military aircraft.

The advantages obtained in the practice of the invention may be further appreciated by considering the desorption portion of the precessing cycle. To maintain a cyclic, steady state performance at a given product purity level, a buildup of adsorbed material may not be tolerated. Nevertheless, more of the readily adsorbable component, i.e., impurities such as nitrogen in the oxygen recovery embodiment, are introduced into each bed of the RPSA system in a given unit of feed time as the feed gas pressure to the system is increased. The average bed pressure at the end of the adsorption step will also, of course, be higher at higher feed pressures. If the desorption time were not changed from that employed at lower pressure, it would be required to desorb more nitrogen or other impurities at a higher average desorption pressure. The discontinuous feed of the invention permits the RPSA process to be operated within the same total cycle time as heretofore employed, with less impurities being introduced into the bed as part of the feed gas mixture and with a lower average bed pressure at the end of the adsorption step as a result of the shorter feed step at adsorption pressure employed in the practice of the invention. The average bed pressure will be even lower in those embodiments in which a delay period follows the feed-adsorption step is discussed above. As the invention enables the exhaust time to remain essentially the same, or even to be lengthened, allowing the desorption operation to reach a low average desorption pressure that is desirable in embodiments in which more impurities must be desorbed in each processing cycle. By contrast, the shortening of the feed step in the continuous process referred to above has the effect of shortening the entire processing cycle time. In such a case, therefore, time would also have to be taken from the other steps as well, i.e., from the exhaust, delay or representation times, and performance of the RPSA process would necessarily be disadvantaged. It should be noted that the advantages of the relatively short feed step accomplished as herein disclosed can also be achieved, in operation of the RPSA process on a continuous feed basis, employing a sufficient number of beds so that the feed time can be made less than the exhaust time within the overall processing cycle time in each bed. For example, a six bed RPSA system having a feed-adsorption time in each bed of 0.4 seconds can be operated with the feed gas mixture being continuously passed to each of the six beds, in sequential order, for a total cycle time of 2.4 seconds before the passing of feed gas is again began in the first bed at the start of a new overall processing cycle. This system, or other such systems in which the number of beds is such that this number, multiplied by the feed time to each bed, equals the total processing cycle time to the system, can be operated to achieve the processing advantages herein described with reference to the invention. The greater number of beds required in such a system, and the greater complexity of flow distribution throughout the system because of the greater number of beds, represent significant technical and economic disadvantages as compared with the use of a discontinuous feed process as herein disclosed and claimed.

EXAMPLE

The advantages of the invention were illustrated in a series of comparative runs at increasing pressure using both the continuous feed of the conventional RPSA process and the discontinuous feed of the RPSA process of the invention. In these runs, a three bed RPSA system was employed, with each adsorbent bed having a 5-inch inside diameter and a length of 12 inches. The adsorbent employed was 13X molecular sieve having a 40×80 U.S. Standard mesh size distribution. In each run, the process was employed for air separation to achieve an enriched product oxygen purity of 94.5%. A total cycle time of 2.4 seconds was employed in each run. The conventional, continuous feed process employed the feed, delay, exhaust and repressurization sequence with such steps consuming 0.8, 0.3, 0.8, and 0.5 seconds, respectively, as in the illustrative cycle referred to above. The discontinuous cycle of the invention also employed a feed, delay, exhaust and repressurization sequence with such steps consuming 0.4, 0.3, 0.9 and 0.8 seconds, respectively in each bed. Upon termination of the feed to each bed, the feed to the three-bed adsorption system was temporarily discontinued for a period of about 0.5 seconds before commencing the passing of the feed gas mixture to the next succeeding bed. This feed discontinuity as well as the time period for each feed step was maintained essentially the same throughout the processing cycle. The comparative results of such runs are shown in the Table as follows:

TABLE

| Feed Pressure, psig | Process Recovery, % O$_2$* | Absorbent Productivity lbs Pure O$_2$/lb. absorbent - hr. |
|---|---|---|
| Continuous Feed: | | |
| 20 | 12.8 | 0.205 |
| 30 | 11.9 | 0.195 |
| 20 | 14.1 | 0.167 |
| 40 | less than 4 | 0.080 |
| Discontinous Feed: | | |
| 20 | 20.8 | 0.260 |
| 30 | 19.0 | 0.330 |
| 40 | 16.2 | 0.381 |

*Product Enrichment Factor 94.5% oxygen in each run.

As will be seen from these results, the discontinuous feed process of the invention resulted in improved product recovery and a significant increase in adsorbent productivity at 30 and 40 psig as compared with the results at 20 psig. By comparison, the conventional process had reduced recovery and lower adsorbent productivity at the pressures above 20 psig, consistent with the background description of the problems encountered in attempting to extend the conventional process to higher pressure applications. It should also be noted that, although the process of the invention is particularly useful in extending the RPSA technology to higher pressures, the results achieved at 20 psig were also favorable compared to the conventional process, confirming the disclosure above that the invention can be successfully applied at the lower pressure levels to which the conventional process has been effectively limited as well as at the higher pressure levels to which it is desired to extend RPSA operations. In other tests, the invention has been successfully employed at both lower and higher pressure levels than in the Example above, e.g. at about 10 psig and at pressures of 50 and 60 psig. In general, it has been found that, as the feed pressure is increased in the RPSA system of the invention, the productivity of the process increases at various high enrichment levels, including maximum product enrichment conditions.

It will be appreciated that various changes and modifications can be made in the details and conditions employed in the discontinuous process herein described without departing from the scope of the invention as set forth in the appended claims. Thus, the adsorbent employed may be any commercially available adsorbent capable of selectively adsorbing one or more less readily adsorbable components from a gas mixture thereof with more readily adsorbable gas components. The adsorbents mentioned in the Earls et al patent, U.S.

Pat. No. 4,194,891 and in the Jones et al patent, U.S. Pat. No. 4,194,892 can readily be employed in the practice of the invention. Likewise, the invention can be applied for a variety of gas separation applications, as in conventional pressure swing adsorption technology, in such circumstances where the advantages of a rapid processing cycle and high adsorbent productivity are desired. While the on-board oxygen enrichment for military aircraft has been referred to herein as a highly desirable practical application of the invention, therefore, hydrogen separation and purification from gas mixtures containing CO and/or methane is one of a number of gas separation operations to which the invention can be applied in appropriate circumstances. It should be noted that the invention can be practiced for air separation applications wherein nitrogen is the desired product and oxygen is the more readily adsorbable component. For this purpose, particular commercially available adsorbents, e.g., 4 A zeolite molecular sieve, and processing conditions would be employed such that nitrogen rather than oxygen is the less readily adsorbable component. In such air separation embodiments in which nitrogen is the less readily adsorbable component recovered as product effluent, the total operating or cycle time for each process cycle is within the overall time limitations, i.e., up to about 30 seconds, applicable to RPSA systems, with the total operating time for each cycle being preferably from about 4 to about 20 seconds. Those skilled in the art will also appreciate that the size and length of each adsorbent bed employed in the practice of the invention will vary depending on the separation to be made, the product purity requirements, the adsorbent employed, the pressure level desired and the overall limitations that may pertain to the size and length of each bed, and the size of the overall system for each such separation application. In general, however, the invention is found to enable higher pressure RPSA operations to be carried out without a necessary increase in the size or length of the adsorbent beds and/or to enable the size and length of the beds to be reduced without adverse effect on performance and product stability.

Those skilled in the art will appreciate that various mechanical means can be devised to produce the essentially uniform feed periods and feed discontinuity periods employed in the practice of the invention. One very convenient and desirable means for achieving such purpose is by the use of a rotary valve arrangement that will permit the feeding of the feed gas mixture to each bed or set of beds in proper sequence in accordance with the overall processing sequence employed in a given application. The Snyder patent, U.S. Pat. No. 4,272,265 assigned to Essex Cryogenics, discloses a rotary valve arrangement as developed for a continuous feed application of a pressure swing adsorption technique for oxygen-enrichment by air separation. As will be seen from FIG. 11 of the drawings of the patent, the apparatus is designed so that, upon termination of the feed of air to one bed, the feed of air to the next bed commences, as in the conventional operations disclosed in the Earls et al patent referred to above. In FIG. 6, of the Snyder patent, one embodiment of the rotary valve arrangement for continuous air flow is shown. As described in Col. 5, lines 35-42 of the patent, single circular port 153 of the disc-like portion of rotor 111 is adapted to be aligned with each of passages 127, 128 and 129 in succession, with the diameter of port 153 being substantially identical with the inside diameter of sleeve 135 and the corresponding sleeves so that the continuous feed of gas to the adsorption system is maintained as is required in conventional RPSA operations. In order to accommodate the discontinuity of feed as provided by the invention as herein disclosed and claimed, the rotary valve apparatus of the invention can be modified by making said port 153 and/or the inside diameter of sleeve 135 and the other sleeves smaller or otherwise changed so that the port and sleeves are aligned and out-of-alignment in proper sequence to accomplish the desired feed and temporary discontinuance of feed to be employed in a particular embodiment of the invention. It will be appreciated that various detailed modification or improvements may be made in such a rotary valve or in the control mechanisms therefor in order to optimize the RPSA system designed to carry out the process of the invention. Such mechanical details do not form a part of this invention, however, and need not be described in further detail herein with respect to the RPSA process of the invention.

Other mechanical features of the apparatus used to perform the process of the invention will be subject to variation, change or adjustment depending on the circumstances of a particular application, as will be appreciated by those skilled in the art. In this regard, it should be noted that the Earls et al patent referred to above discloses the use of a single product manifold joined to the discharge end of each bed in the system. Such a single product manifold is preferred in the apparatus of the RPSA system as used to practice the invention. Such a product manifold enables product gas to be conveniently available at high pressure for repressurization of the beds in the appropriate processing sequence of the invention.

The single product manifold feature of the apparatus facilitates the countercurrent repressurization of the bed during the delay step, described above, that is preferably employed following the exhaust step of the overall processing sequence. The single product manifold assures that a supply of high pressure product gas will be available for such countercurrent repressurization purposes during said delay period regardless of the overall processing sequence of the RPSA process or of the rate of product gas withdrawal from the overall system. It should be noted that the first delay step is also employed in preferred embodiments of the invention. This delay allows sufficient time for the feed to penetrate more fully into the bed. While it is possible to increase the feed step at the expense of the delay period, it will be appreciated from the descriptions above that the greater amount of feed gas added to the bed in each cycle, in such a case, decreases the desired recovery and productivity under such circumstances.

The RPSA process of the invention provides a highly desirable improvement in the overall RPSA technology. In enabling higher pressure operations to be carried out without a necessary increase in the size of the system and without sacrifice in product purity, the invention enables higher productivity levels to be achieved in a manner that enhances the use of the RPSA process in practical applications of commercial importance.

Therefore, we claim:

1. In a rapid pressure swing adsorption process for the selective adsorption of at least one more readily adsorbable gas component from a feed gas mixture in an adsorption system having at least two adsorbent beds, each of which undergoes a cyclic processing sequence that includes (1) feeding said gas mixture to the feed end of the bed for adsorption at high adsorption pressure, with withdrawal of the less readily adsorable gas component as product effluent from the discharge end of the bed, (2) countercurrently depressurizing said bed, thereby exhausting the more readily adsorbable component from the feed end of the bed, and (3) repressurizing said bed from the lower pressure reached during countercurrent depressurization, the improvement comprising temporarily discontinuing the feeding of said gas mixture to the adsorption system upon completion of the feed step to each bed in the system, the time of said feed step to each bed and the time of discontinuity of feed before commencing the passing of said gas mixture to the next succeeding bed being approximately the same throughout the processing cycle, the feed step at adsorption pressure for each bed being shorter in duration than said exhaust step, whereby the discontinous feed cycle enables greater productivity to be achieved for a given product gas purity without increase the size of the adsorption system, thereby enhancing overall process performance.

2. The process of claim 1 in which from 2 to 10 adsorbent beds are employed in said adsorption system.

3. The process of claim 2 in which from 2 to 5 adsorbent beds are employed in said system.

4. The process of claim 1 in which said adsorption pressure is above about 20 psig.

5. The process of claim 4 in which said adsorption pressure is from about 25 psig to about 60 psig.

6. The process of claim 4 in which 2 adsorbent beds are employed in said system.

7. The process of claim 4 in which 3 adsorbent beds are employed in said system.

8. The process of claim 6 in which said adsorption pressure is from about 25 psig to about 60 psig.

9. The process of claim 7 in which said adsorption pressure is from about 25 psig to about 60 psig.

10. The process of claim 1 in which the total operating time for each processing cycle is from about 2 to about 10 seconds.

11. The process of claim 10 in which from 2 to 3 adsorption beds are employed in said system, the adsorption pressure being from about 25 to about 60 psig.

12. The process of claim 1 in which said processing cycle comprises, in sequence in each bed, said feed step at high adsorption pressure, a delay period, said exhaust step and said repressurization step, with no feed gas mixture being fed to the bed and no gas being exhausted from the bed by countercurrent depressurization during said delay period, the gas pressure in the bed decreasing from adsorption pressure as said gas travels through the bed to the discharge end therefor during said delay period.

13. The process of claim 12 in which said adsorption pressure is from about 25 to about 60 psig.

14. The process of claim 13 in which each bed is countercurrently depressurized to about atmospheric pressure during said exhaust step.

15. The process of claim 13 in which each bed is countercurrently depressurized to a subatmospheric pressure during said exhaust step.

16. The process of claim 13 in which from 2 to 10 adsorbent beds are employed in said adsorption system.

17. The process of claim 16 in which 2 adsorbent beds are employed in said system.

18. The process of claim 16 in which 3 adsorbent beds are employed in said system.

19. The process of claim 12 in which the feed gas mixture is air, the less readily adsorbable product gas is oxygen and the more readily adsorbable gas component is nitrogen.

20. The process of claim 19 in which said adsorption pressure is from about 25 to about 60 psig.

21. The process of claim 20 in which said feed step at high adsorption pressure consumes from about 0.2 to about 0.6 seconds.

22. The process of claim 1 in which the feed gas mixture is air, the more readily adsorbable component comprises nitrogen, and the less readily adsorbable component comprises oxygen.

23. The process of claim 22 in which the total operating time for each cycle is from about 2 to about 10 seconds.

24. The process of claim 23 in which said total operating time is from about 2 to about 4 seconds.

25. The process of claim 21 in which the time for said feed step at adsorption pressure, the delay period, the exhaust step and said repressurization step is about 0.4, 0.3, 0.9 and 0.8 seconds, respectively, the total cycle time being about 2.4 seconds.

26. The process of claim 22 in which 2 adsorbent beds are employed in the adsorption system.

27. The process of claim 25 in which 3 adsorbent beds are employed in the adsorption system.

28. The process of claim 27 in which said adsorption pressure is from about 30 to about 40 psig.

29. The process of claim 1 in which said processing cycle comprises, in sequence in each bed, said feed step at high adsorption pressure, said exhaust step, and a delay period, with no feed gas mixture being fed to the bed and no gas being exhausted from the bed by countercurrent depressurization during the delay period, the gas pressure rising in the bed during the delay period by partial countercurrent repressurization of the bed with product quality gas that passes from the downstream product manifold into the discharge end of the bed during the delay period, said delay period constituting the repressurization step of the processing cycle.

30. The process of claim 29 in which said adsorption pressure is from about 25 to about 60 psig.

31. The process of claim 30 in which each bed is countercurrently depressurized to about atmospheric pressure during said exhaust step.

32. The process of claim 30 in which each bed is countercurrently depressurized to a subatmospheric pressure during said exhaust step.

33. The process of claim 30 in which from 2 to 10 adsorbent beds are employed in said adsorption system.

34. The process of claim 33 in which 2 adsorbent beds are employed in said system.

35. The process of claim 33 in which 3 adsorbent beds are employed in said system.

36. The process of claim 29 in which the feed gas mixture is air, the less readily adsorbable product gas is oxygen and the more readily adsorbable component is nitrogen.

37. The process of claim 36 in which said adsorption pressure is from about 25 to about 60 psig.

38. The process of claim 1 in which said processing cycle comprises, in sequence in each bed, said feed step at high adsorption pressure, a first delay period, said exhaust step and a second delay period, said second delay constituting the repressurization step of the processing cycle.

39. The process of claim 38 in which said adsorption pressure is from about 25 to about 60 psig.

40. The process of claim 39 in which from 2 to 10 adsorbent beds are employed in the adsorption system.

41. The process of claim 40 in which the feed gas mixture is air, the less readily adsorbable product gas is oxygen and the more readily adsorbable gas component is nitrogen.

42. The process of claim 41 in which from 2 to 5 adsorbent beds are employed in said system.

43. The process of claim 1 in which the feed gas mixture is air, the more readily adsorbable component comprises oxygen, and the less readily adsorbable component comprises nitrogen.

44. The process of claim 43 in which the total operating time for each cycle is from about 4 to about 20 seconds.

45. The process of claim 44 in which said adsorption pressure is above from about 20 psig.

46. The process of claim 45 in which said adsorption pressure is about 25 psig to about 60 psig and in which from 2 to 10 adsorbent beds are employed in the system.

47. The process of claim 46 in which from 2 to 5 adsorbent beds are employed.

* * * * *